United States Patent
Leutard et al.

(10) Patent No.: US 10,502,083 B2
(45) Date of Patent: Dec. 10, 2019

(54) TURBOMACHINE ELEMENT COMPRISING AN AUXILIARY SEALING MEANS, AND METHOD FOR TESTING THIS ELEMENT

(71) Applicant: SAFRAN AIRCRAFT ENGINES, Paris (FR)

(72) Inventors: Florence Irène Noëlle Leutard, Moissy-Cramayel (FR); Thibault Jamon, Moissy-Cramayel (FR); Olivier Renon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 331 days.

(21) Appl. No.: 15/320,937

(22) PCT Filed: Jul. 21, 2015

(86) PCT No.: PCT/FR2015/052004
§ 371 (c)(1),
(2) Date: Dec. 21, 2016

(87) PCT Pub. No.: WO2016/016545
PCT Pub. Date: Feb. 4, 2016

(65) Prior Publication Data
US 2017/0152754 A1    Jun. 1, 2017

(30) Foreign Application Priority Data
Jul. 29, 2014 (FR) ...................................... 14 57350

(51) Int. Cl.
*F01D 11/10* (2006.01)
*F01D 5/02* (2006.01)
(Continued)

(52) U.S. Cl.
CPC ............... *F01D 11/10* (2013.01); *F01D 5/02* (2013.01); *F01D 5/026* (2013.01); *F01D 9/04* (2013.01);
(Continued)

(58) Field of Classification Search
CPC . F01D 11/10; F01D 9/04; F01D 25/16; F01D 5/02; F01D 5/026; F01D 25/186;
(Continued)

(56) References Cited

U.S. PATENT DOCUMENTS 5,975,537 A * 11/1999 Turnquist ............... F16J 15/443
277/411
6,203,273 B1 * 3/2001 Weiner .................. F01D 11/025
415/131

(Continued)

FOREIGN PATENT DOCUMENTS

| EP | 1 577 495 A1 | 9/2005 |
| EP | 1 757 777 A1 | 2/2007 |
| FR | 2 644 843 A1 | 9/1990 |

OTHER PUBLICATIONS

Written Opinion of the International Searching Authority dated Nov. 16, 2015, issued in corresponding International Application No. PCT/FR2015/052004, filed Jul. 21, 2015, 5 pages.
(Continued)

*Primary Examiner* — Joseph J Dallo
*Assistant Examiner* — Kurt Philip Liethen
(74) *Attorney, Agent, or Firm* — Christensen O'Connor Johnson Kindness PLLC

(57) ABSTRACT

A turbomachine element includes a stator, a rotor, and a first sealing means for sealing between the rotor and the stator. The element is arranged to be active when the rotor is in the operating position of same around the axis of rotation thereof. The element includes an auxiliary pressure sealing
(Continued)

means, sealing between the rotor and the stator and is arranged so that the two sealing means are active when the rotor is placed along the axis of rotation thereof during an assembly operation in a test position. In the test position, the rotor and the stator form an enclosure between said two sealing means.

10 Claims, 3 Drawing Sheets

(51) Int. Cl.
| | |
|---|---|
| F01D 21/00 | (2006.01) |
| F01D 25/16 | (2006.01) |
| F01D 25/18 | (2006.01) |
| F02C 7/28 | (2006.01) |
| F01D 9/04 | (2006.01) |

(52) U.S. Cl.
CPC .......... *F01D 21/003* (2013.01); *F01D 25/16* (2013.01); *F01D 25/166* (2013.01); *F01D 25/186* (2013.01); *F02C 7/28* (2013.01); *F05D 2220/30* (2013.01); *F05D 2240/54* (2013.01); *F05D 2260/83* (2013.01)

(58) Field of Classification Search
CPC ........ F01D 25/166; F01D 21/003; F02C 7/28; F05D 2240/54; F05D 2260/83; F05D 2220/30

See application file for complete search history.

(56) References Cited

U.S. PATENT DOCUMENTS

| 7,360,434 B1* | 4/2008 | Hayes ................... F01D 21/003 |
| | | 73/23.22 |
| 2005/0196088 A1 | 9/2005 | Charier et al. |
| 2005/0264595 A1 | 12/2005 | Dodd |
| 2007/0044307 A1 | 3/2007 | Bergerot et al. |
| 2010/0003122 A1* | 1/2010 | Bock ...................... F01D 11/22 |
| | | 415/13 |
| 2013/0106061 A1* | 5/2013 | Ruggiero ................ F01D 11/02 |
| | | 277/411 |

OTHER PUBLICATIONS

International Preliminary Report on Patentability dated Jan. 31, 2017, issued in corresponding International Application No. PCT/FR2015/052004, filed Jul. 21, 2015, 1 page.

International Search Report mailed Nov. 16, 2015, issued in corresponding International Application No. PCT/FR2015/052004, filed Jul. 21, 2015, 5 pages.

* cited by examiner

TURBOMACHINE ELEMENT COMPRISING AN AUXILIARY SEALING MEANS, AND METHOD FOR TESTING THIS ELEMENT

FIELD OF THE INVENTION AND PRIOR ART

The present invention relates to the field of turbine engines and more particularly to the design of the sealing joints between a rotor and a stator, in particular close to a bearing for guiding the rotor. Said invention relates in particular to a testing method for checking a sealing joint in a lubricating enclosure around such a bearing.

A turboshaft engine generally comprises, from upstream to downstream in the direction of flow of the gases, a fan, one or more compressor stages, a combustion chamber, one or more turbine stages and a gas exhaust pipe. Rotors, which can be coupled to one another by different transmission and gear systems, correspond to these different elements.

In addition, in order to allow the guide bearings of the rotary bodies to be lubricated and cooled, the turbojet engine conventionally comprises a lubricating circuit. The circuit for lubricating a bearing comprises a lubricating enclosure which is formed by a portion of the inner casing of the turbine engine surrounding a rotor portion on either side of the bearing.

The axial ends of said lubricating enclosure are passed through by the rotor. In order to confine the oil to the enclosure, the passages of the rotor through the enclosure are generally equipped with labyrinth seals. In some conditions, a flow of oil can escape from the enclosure. The patent application FR1260598 describes for example a journal which is designed to recover said oil and send it back into the lubricating circuit without said oil escaping into the air flow passing through the turbine engine.

Another, complementary, manner of limiting the losses of oil consists in creating a depressurisation of the lubricating enclosure. The patent application WO2013083917 describes, for example, a system that uses annular seals at the passage of the rotor in order to ensure sealing between the enclosure and an adjacent external volume so as to enable said depressurisation. Furthermore, the patent application WO2014006338 describes a way of using a segmented radial seal in this context.

Installed upstream of the lubricating enclosure, said segmented radial seal makes it possible to control the pressure thereof. Downstream of this same enclosure, sealing can be ensured by a labyrinth at the passage of the rotary body. The depressurisation of the enclosure leads to the air arriving therein from outside. In this way, the pressure difference ensures sealing of the labyrinth seal with respect to the oil.

However, it is essential to ensure the proper operation of the segmented radial seal because it plays a major role in balancing the pressures in the enclosure. However, the mounting of the rotor is generally carried out from downstream to upstream. The segmented radial seal is fragile and can become damaged when the rotor is mounted in the casing if said seal contacts with the rotor as a result of incorrect alignment. In addition, in this case, the segmented radial seal is no longer accessible for carrying out a visual inspection of the condition thereof.

The primary objective of the invention is that of proposing a means for simply inspecting the operation of the segmented radial seal when the rotor is installed in the casing.

Furthermore, downstream, the splashes of oil coming from the bearing can be detrimental to the effectiveness of the sealing means if said splashes reach said sealing means.

One solution would be to move the seals away from the bearing, but the axial space in the environment of the turbine engine is limited.

Another objective of the invention is to make possible a design of the enclosure around the guide bearing which is axially compact whilst also protecting the seals from splashes of oil.

SUMMARY OF THE INVENTION

For this purpose, the invention relates to an element comprising a stator, a rotor, and a first sealing means between the rotor and the stator which is arranged so as to be active when the rotor is in an operating position around the axis of rotation thereof, the element being characterised in that it comprises an auxiliary pressurised sealing means, between the rotor and the stator, which is arranged so that said two sealing means are active when the rotor is placed along the axis of rotation thereof during a process of mounting in a test position, the rotor and the stator forming, in said test position, an enclosure between said two sealing means, and in that the auxiliary pressurised sealing means is arranged so as to be or become inactive when the rotor is placed in an operating position.

The term "pressurised sealing" signifies that the means is sufficiently impermeable to gases to be able to maintain a pressure difference on either side. A contrario, impermeability to oil is also mentioned to signify that the means is of capable of blocking oil but not necessarily capable of preventing gas leaks.

The object of the invention is achieved by means of the fact that when the enclosure is formed between the two sealing means when the rotor is placed in the test position, it is possible to ascertain, owing to the auxiliary sealing means, a pressure difference between the closed enclosure and the environment thereof, and to test the condition of the first sealing means by observing the change in pressure in the enclosure or outside. It is thus not necessary, in particular when the seal is inaccessible when the rotor is in the stator, to demount the element in order to check the operating state of the sealing means. Furthermore, since said auxiliary sealing means is inactive when the turbine engine is in operation, said means does not cause unnecessary friction during the operation of the turbine engine.

In a first variant, the auxiliary pressurised sealing means is arranged so as to be inactive before any operation of the turbine engine element.

Advantageously, the auxiliary pressurised sealing means comprises a pressurised sealing joint which is rigidly connected to one of the bodies among the rotor or the stator and is arranged so as to rest on a cylindrical sealing surface when the rotor is in a test position which is axially offset by a distance which is determined with respect to the operating position, and so as to be removed from said sealing surface when the rotor is in the operating position. The seal can be a PTFE seal, short for polytetrafluoroethylene, which comprises a ring which is made of said material.

Advantageously, the element further comprises a bearing between the stator and the rotor, said bearing comprising roller bearings between a first ring and a second ring, one of said rings being rigidly connected to the stator, and the other being rigidly connected to the rotor, the first ring of which allows the roller bearings to slide axially and comprises an axial extension which is arranged so as to act as a surface for guiding the rotor along the axis of rotation during a movement from the operating position to the test position or inversely.

This makes it possible to guide the rotor between the operating and test positions, thus limiting the risks of damaging the first sealing means.

Advantageously, the rotor being arranged so as to be mounted in the stator in a mounting direction along the axis, the test position is located before the operating position along said mounting direction.

This makes it possible to simply integrate a test of the first sealing means in the mounting procedure. It is thus possible to start by installing the rotor in the stator, stopping in an intermediate position to carry out the test, then completing the installation by continuing to translate the rotor in the same direction. Furthermore, it is not necessary to make adjustments in order to be able to go past the operating position along the axis before returning to the operating position, which may be difficult or even impossible in the turbine engine.

In another variant, the auxiliary pressurised sealing means is arranged so as to be inactive during a first operation when the rotor rotates at a speed which is at least equal to a predetermined value.

Advantageously, the auxiliary pressurised sealing means comprises a pressurised sealing joint which is rigidly connected to one of the bodies among the rotor or the stator and is arranged so as to rest on a cylindrical sealing surface when the rotor is fixed in rotation with respect to the stator and so as to be removed when the rotor is set into rotation.

Such a seal, for example made of beeswax, can be removed by the heat generated by the friction. Using this technique, the test position can be axially the same as the operating position, and this avoids manipulations and makes the overall device more compact.

Advantageously, the stator and the rotor are arranged so as to form an enclosure for lubricating a device which is located axially between said two sealing means when the rotor is in the operating position thereof.

The lubricating enclosure can be used in this case as a depressurisation enclosure between the first seal and the auxiliary pressurised seal. Advantageously, the lubricating enclosure, which is designed to retain the oil around the bearing, does not have any openings other than the passages of the rotor through the stator and openings for the passage of the oil between the enclosure and the lubricating circuit. By placing the rotor in the test position, the first sealing means and the auxiliary pressurised sealing means seal the passages of the rotor. It is thus sufficient to block the openings for the passage of the oil except for one in order to suck the air into the lubricating enclosure and create a negative pressure to test the condition of the first sealing joint.

Preferably, the assembly comprises radial means for impermeability to oil between the rotor and the stator, which are located between the bearing and the second pressurised sealing means and are active when the rotor is in the first axial position. In this way, said means for impermeability to oil prevent the second pressurised sealing means from being polluted by the oil from the lubricating enclosure.

Preferably, the first sealing means comprises a radial pressurised sealing joint, for example a segmented radial seal, which is rigidly connected to one of the bodies among the rotor or the stator and is arranged so as to rest on a cylindrical sealing surface, which is rigidly connected to the other body, when said first means is active.

Said means is thus a pressurised sealing means when the rotor is in the operating position, for example in order to inspect the depressurisation of the lubricating enclosure when the turbine engine is in operation.

Preferably, the radial sealing joint is radially outside the cylindrical sealing surface.

This makes it possible, in particular when the mounting direction means that the first sealing joint is located upstream of the bearing, to prevent the radial seal from passing through the bearing during the mounting and becoming damaged. This also makes it possible to use an extension of the sealing surface that cooperates with the radial sealing joint to place between said joint and the bearing a means, for example a twist, which cooperates with said sealing surface to protect the seal from the oil from the lubricating enclosure.

Advantageously, said first seal being placed radially outside, the cylindrical sealing surface extends axially in the mounting direction, beyond the portion thereof which is in contact with the radial sealing joint in the operating position, over a distance which is at least equal to that separating the operating position from the test position.

In this way, the cylindrical sealing surface extends axially in such a way that the radial sealing joint is in contact in a continuous manner with the sealing surface when the rotor is moved between the test and operating positions. This makes it possible to prevent impacts from the seal contacting said surfaces between the tests and operation, which can cause damage to said seal.

In general, the stator radially surrounds the rotor. The portions of a sealing means which are connected to the stator are, in this case, radially outside the corresponding portions which are connected to the rotor.

Advantageously, an annular cowl surrounding the bearing is arranged so as to prevent radial splashes of the oil having lubricated the bearing, and at least one sealing means inside the enclosure comprises, towards the bearing, a ring as a continuation of the radially innermost portion of said sealing means, said ring having an external diameter which is at least equal to the internal diameter of said cowl. Preferably, said ring covers said annular cowl at least in part when the rotor is in the first axial position. This makes it possible to prevent direct splashes of oil coming from the bearing. Preferably, said ring covers said cowl at least in part when the rotor is in the first axial position.

The invention also relates to a turbine engine comprising an element as described above.

The invention also relates to a method for testing a first sealing means in a turbine engine element according to the invention, comprising a step consisting in installing the rotor in said test position, producing an air suction opening in the enclosure, and then creating a negative pressure in the enclosure between the first sealing means and the auxiliary pressurised sealing means, by sucking the air through said opening.

BRIEF DESCRIPTION OF THE DRAWINGS

The present invention will be better understood, and other details, features and advantages of the present invention will become clearer upon reading the following description of a non-limiting example with reference to the accompanying drawings, in which.

DESCRIPTION OF AN EMBODIMENT

Figure 1:
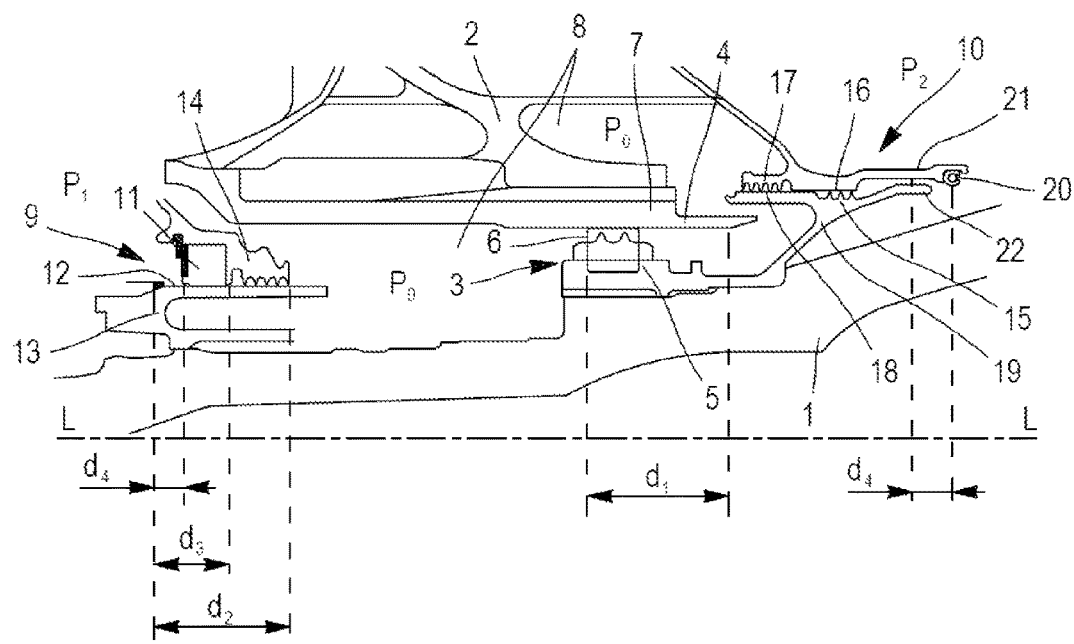
FIG. 1 is a schematic view of a meridian section of a stator and of a rotor according to one embodiment of the invention when the rotor is in the operating position in a turbine engine.

FIG. 1 shows a turbine engine shaft 1 which is rotatable about an axis LL, installed in the operating position in a casing 2, in the region of a bearing 3 for guiding the shaft 1 in the turbine engine.

In FIG. 1 and the following drawings, the main flow of the gases in the turbine engine goes from left to right. The elements shown in the example corresponding to the drawings are located in a portion of the turbine engine which is surrounded by said main flow. In the following description, the terms upstream and downstream are understood in relation to said main flow.

The guide bearing 3 is formed in particular by an outer ring 4, which is fixed to the casing 2, and an inner ring 5, which is fixed to the shaft 1, between which rollers 6 can roll freely. The bearing 3 is designed in such a way that the rollers 6 remain held on the inner ring 5 when the shaft 1 is moved out of the operating position thereof, for mounting or demounting operations. Roller bearings other than rollers, for example balls, can be used. Furthermore, it is conceivable to design a bearing 3, which is shown in FIG. 2b, in which the roller bearings 6 are held on the side of the outer ring 4 when the rotary shaft 1 is demounted.

The outer ring 4 is connected to the casing 2 by a support part 7 of the bearing 3. The inner ring 5 is generally fixed to the surface of the rotary shaft 1.

The casing 2 and the rotary shaft 1 are arranged so as to form a lubricating 4 enclosure 8 around the bearing 3. Said enclosure 8 comprises a passage for the shaft 1 upstream of the bearing 3 and a passage for the shaft 1 downstream of the bearing 3.

The lubricating enclosure 8 is part of the lubricating circuit of the turbine engine. The oil re-enters the enclosure 8 through an inlet opening, which is not shown in the drawing, and is then directed towards the bearing 3 to lubricate it. After having lubricated the bearing 3, the oil leaves said bearing again whilst being projected in different directions. The function of the enclosure 8 is in particular that of recovering said oil in order for it to be fed back through an outlet opening, which is also not shown in the drawing, so as to send said oil back towards the lubricating circuit.

To prevent losses of oils, the passages of the shaft 1 in the enclosure 8 are equipped with radial sealing means 9, 10, which are capable in particular of blocking off the oil. In addition, in particular in order to improve the sealing of said radial sealing means 9, 10, during the rotation of the shaft 1, the element is designed so that the pressure PO of the enclosure 8 is less than the pressures P1, P2, which are located outside the passages of the shaft 1, when the turbine engine is in operation. This depressurisation contributes to the sealing of the enclosure 8.

In order to achieve this result, the radial sealing means 9 of the upstream passage in this case comprises a segmented radial sealing joint 11, which is formed of a sealing ring for carbon segments which are held so as to be pressed against one another, which ring is rigidly connected to the casing 2. Said segmented radial sealing joint 11 cooperates with a cylindrical surface 12 which comes into contact with the inner surface thereof. The cylindrical surface 12 is mounted on a sleeve 13 which is rigidly connected to the rotary shaft 1, the cross section of which, in a meridian plane, is U-shaped and is in parallel with the axis of rotation LL. This shape allows sufficient resilience for the shaft 1 to be able to be installed in the casing 2 by going in this case from right to left along the axis of rotation LL, and then for the segmented radial seal 11 and the cylindrical surface 12 to bear against one another when the shaft 1 is in the operating position with respect to the casing 2.

The design of the segmented radial seal 11 allows sufficient sealing for slowing the passage of the air and thus establishing a pressure difference between the two sides of said seal. In this way, when the turbine engine is in operation, the pressure PO of the enclosure 8 can be maintained at a value which is less than the pressure P1 which is established in the space upstream of the radial sealing means 9 of the upstream passage, which is in communication with regions of higher pressure in the turbine engine.

The radial sealing means 9 is supplemented by a twist 14, inside the enclosure 8 with respect to the segmented radial seal 11. Said twist 14 cooperates with a portion of the cylindrical surface 12 which extends downstream of the portion that cooperates with the segmented radial seal 11. The function of the twist 14 is to send any oil which may arrive at the upstream passage back towards the enclosure 8 and to protect the segmented radial seal 11 from said oil.

The radial sealing means 10 of the downstream passage of the rotary shaft 1 comprises a labyrinth seal, which is formed by wipers 15 which are rigidly connected to the shaft 1 and contact a cylindrical surface 16 which is rigidly connected to the casing 2 and is made of abradable material. Said labyrinth seal 15, 16 allows for effective sealing from the passage of the oil.

The labyrinth seal 15, 16 is not as effective as the segmented radial seal 11, 12 at establishing a pressure difference in the gases between the ends thereof. However, in the example shown, the flow of the gases around the lubricating enclosure 8 takes place from left to right, and the segmented radial seal 11 blocks the flow of air upstream, and this is sufficient for the pressure PO in the enclosure 8 to also remain less than the pressure P2 which is established in the space downstream of the labyrinth seal 15, 16.

The radial sealing means 10 of the downstream passage in this case is also supplemented by a twist 17, which is placed upstream of the labyrinth seal 15, 16. Said twist 17 cooperates with a ring 18 which extends upstream of the cylindrical surface 16 of the labyrinth seal. The function of the twist 17 is to send any oil which may arrive at the downstream passage back into the enclosure 8 and to protect the labyrinth seal 15, 16 from said oil.

The ring 18 that cooperates with the twist 17 is substantially aligned with the support of the wipers 15 of the labyrinth seal. The element is held by a plate 19 extending from the rotary shaft 1.

According to one aspect of the invention, the plate 19 extends radially in such a way that the diameter of the ring 18 that cooperates with the twist is slightly greater than that of the outer ring 4 of the bearing 3.

Figure 2A:
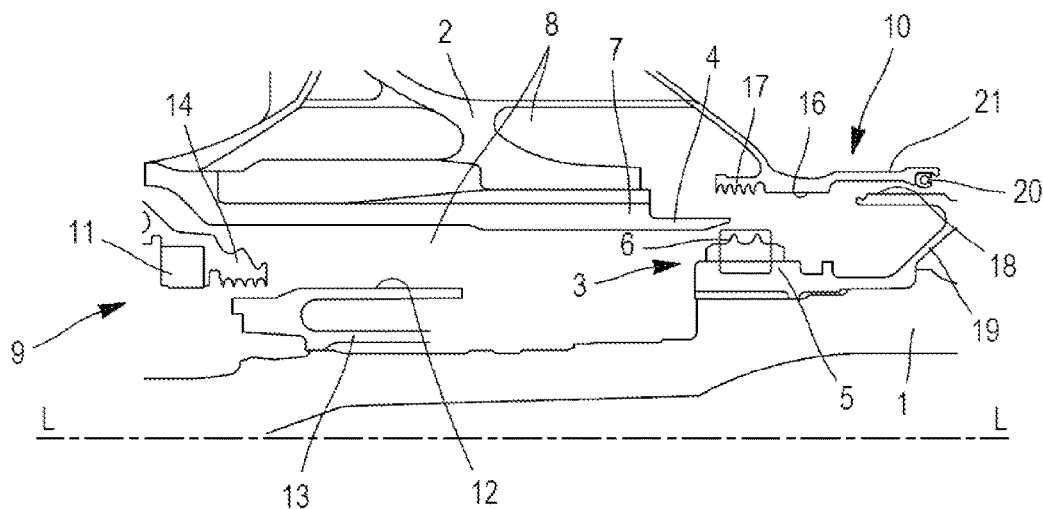
FIG. 2a is a schematic view of a meridian section of the stator and of the rotor from FIG. 1, in the spaced apart position and ready to be assembled.
Figure 2B:
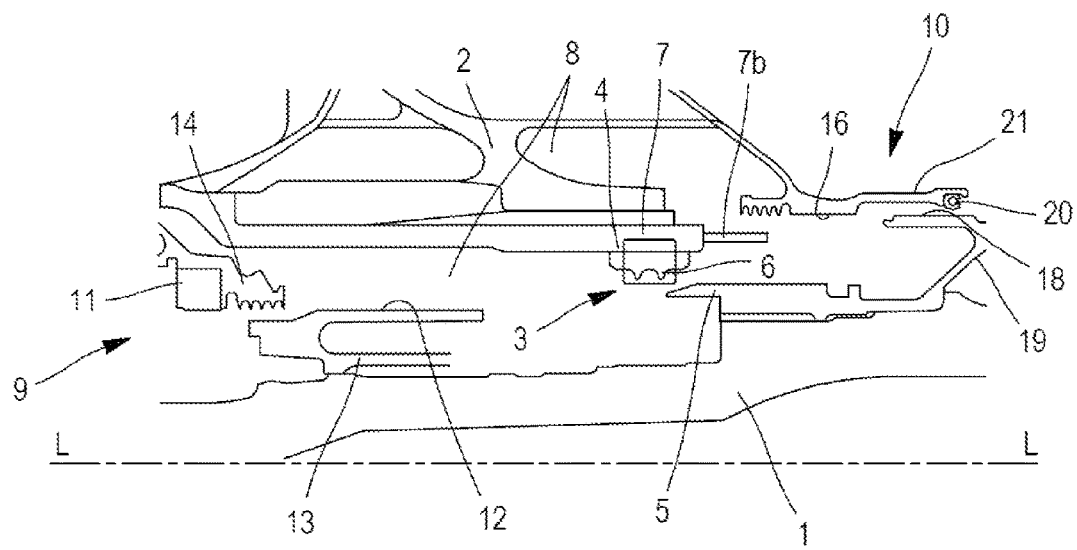
FIG. 2b is a schematic view of a meridian section of a stator and of a rotor according to a variant of the invention, in the spaced apart position and ready to be assembled.

In addition, with reference to FIG. 2a, in one embodiment in which the roller bearings 6 of the bearing 3 slide over the outer ring 4, the extension of the outer ring 4 of the bearing in the downstream direction and the extension of the ring 18 in the upstream direction that cooperates with the twist 17 in this case are arranged in such a way that the ring 18 of the twist 17 partially covers the outer ring 4 of the bearing 3.

This arrangement means that there is no direct path between the bearing 3 and the twist 17 of the downstream passage. The splashes of oil, which are shown by an arrow in FIG. 1, are thus stopped by the ring. This makes it possible to have a compact design downstream of the bearing 3, in which the radial sealing means 10 of the downstream passage is close to the bearing 3, but in which the twist 17 is protected against the splashes of oil.

In the alternative shown, with the shaft 1 and the casing in the detached position in FIG. 2*b*, it is conceivable that it is not the outer ring 4 of the bearing 3 which extends under the ring 18 of the twist 17, but a portion 7*b* of the supporting part 7 of the bearing 3. Said portion 7*b* of the support of the bearing does not act as a track for the roller bearings 6 but forms a cowl which radially surrounds the bearing 3 on the downstream side and which can pass inside the ring 18 of the twist 17 when the shaft 1 is in the operating position.

According to another aspect of the invention, the rotary shaft 1 is installed in the casing 2 by being translated along the axis of rotation LL. In the examples shown, with reference to FIG. 2*a* and FIG. 2*b*, the shaft 1 in the detached position is located downstream of the casing 2, and the mounting is carried out in a direction which goes from downstream to upstream for the rotor.

FIG. 2*a* shows the mounting of the shaft just before the docking for the embodiment from FIG. 1. The lengthening of the outer ring 4 of the bearing 3 is such that the roller bearings 6, which are rigidly connected to the shaft 1, come into contact with said ring before the upstream end of the cylindrical surface 12, which cooperates with the segmented radial seal 11, contacts the downstream portion of the twist 14 of the upstream passage.

This corresponds, with reference to FIG. 1, to the fact that, when the shaft 1 is installed in the operating position, the distance d1 separating the downstream end of the outer ring 4 from the upstream end of the roller bearings 6 of the bearing 3 is greater than the distance d2 separating the upstream end of the cylindrical surface 12 from the downstream end of the twist 4, for the upstream radial sealing means 9.

In this way, the portions of the radial sealing means 9 of the upstream passage of the shaft 1 dock to those of the casing 3, whilst the roller bearings 6 of the bearing 3 are already engaged in the outer bearing ring 4. The movements of the shaft 1 when translated for mounting are thus guided by the bearing 3, which limits the risks of impact during docking or parasitic forces during installation in the radial sealing means 9.

In one variant, it is possible to simply protect the segmented radial seal 11, which is the most fragile. In this case, the distance d1 separating the downstream end of the outer ring 4 from the upstream end of the roller bearings 6 of the bearing 3 is greater than the distance d3 separating the upstream end of the cylindrical surface 12 from the downstream end of the segmented radial seal 11.

It can also be noted that, in this configuration, the requirements for extending the outer ring 4 downstream are consistent for the function of mounting the segmented radial seal 11 and for the function of protecting the twist 17 from the splashes of oil coming from the bearing 3.

In a preferred embodiment, with reference to FIG. 1 and FIG. 2*a*, the roller bearings 6, which are connected to the shaft 1, also dock to the outer ring 4 before the ring 18, which cooperates with the twist 17 downstream, contacts the cylindrical surface 16 which cooperates with the wipers 15 of the labyrinth seal. This also makes it possible to protect the radial sealing means 10 of the downstream passage against impacts during mounting.

In one variant, which is shown in FIG. 2*b*, the roller bearings 6 are rigidly connected to the outer ring 4, which is fixed to the casing 2. In this case, it is the inner ring 5 which has an extension in the upstream direction, beyond the location at which the rolling takes place when the shaft 1 is in the operating position. This extension is such that the inner ring 5 contacts the roller bearings 6 before the portions of the radial sealing means 9, 10 which are rigidly connected to the casing 2 and to the shaft 2 contact one another.

Figure 3:
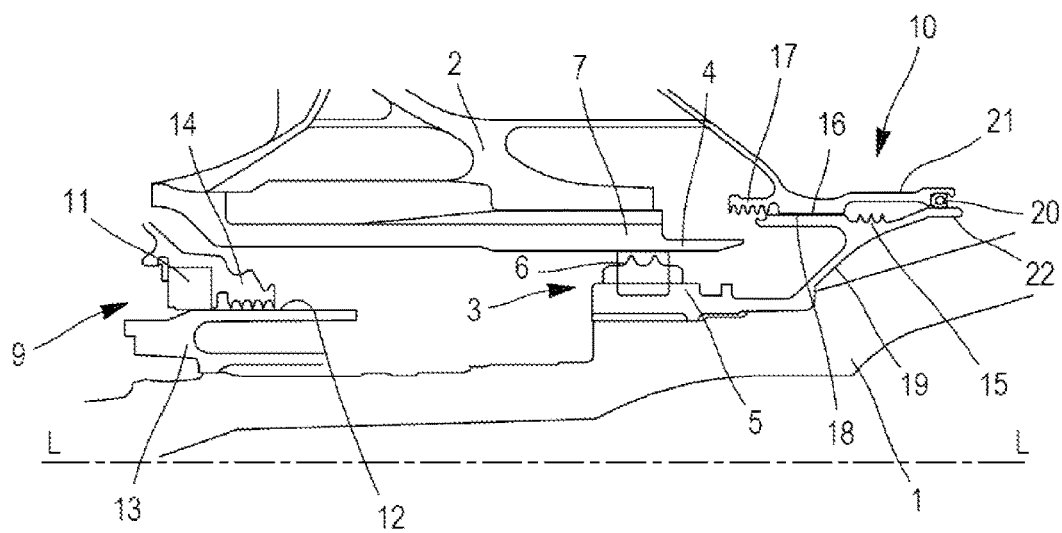
FIG. 3 is a schematic view of a meridian section of the stator and of the rotor from FIG. 1, in an intermediate test position.

According to yet another aspect of the invention, with reference to FIG. 3, a pressurised sealing joint 20 is installed on a ring 21 downstream of the cylindrical surface 16 which cooperates with the wipers 15 of the labyrinth seal. The shaft 1 and the casing 2 are designed in such a way that said pressurised sealing joint 20 bears against a ring 22, which is rigidly connected to the shaft 1 and extends the labyrinth seal 15, when the shaft 1 is in a predetermined position which is offset from the operating position, as shown in FIG. 3.

The pressurised sealing joint 20 in this case is a PTFE seal, which stands for polytetrafluoroethylene, which comprises a ring which is composed of said material and is clamped by a circular spring which presses said ring against the ring 22 of the shaft 1. This type of seal makes it possible to ensure good impermeability to pressure, together with low friction. In addition, said seals are resistant to high temperatures, which can arise at this location in a turbine engine in operation.

However, it is conceivable to use seals which are made of other materials, provided that they ensure impermeability to pressure around the shaft at the passage thereof through the enclosure and that they can withstand the environmental conditions of a turbine engine. By contrast, as will be seen in the following in the operating conditions, said seals do not need to operate with low friction when the shaft 1 is in rotation.

In FIG. 3, the shaft 1 and the casing 2, which are already shown in FIG. 1 and FIG. 2*a*, have a configuration in which the shaft is translated into an intermediate position, the shaft being offset by a distance d4 in the downstream direction with respect to the operating position from FIG. 1.

Said distance d4 corresponds in FIG. 1 to an offset of the PTFE seal 20 with respect to the position in which said seal bears against the ring 22, in such a way that said seal is removed from said ring 22 when the shaft 1 is in the operating position.

In this way, when the shaft 1 is in the operating position, as can be seen in FIG. 1, the PTFE seal 20 is removed from the ring 22. In the example shown, said seal 20 is thus not active when the shaft 1 is in the operating position, and the means 21, 22 with which said seal cooperates do not interact with one another or with other elements of the turbine engine when the shaft 1 is in the operating position. Said means 20, 21, 22 thus do not cause friction or disturbance when the turbine engine is in operation. In addition, in the example, since the means 20, 21, 22 are outside the enclosure 8, they are not at risk of being polluted by splashes of oil from the bearing 3.

Furthermore, the distance d4 of translation towards the intermediate position is less than the distance d1, described previously in FIG. 1, which is required to remove the roller bearings 6 of the bearing 3 from the outer ring 4. The shaft thus passes from the operating position to the intermediate position, and inversely, the shaft 1 being translated with respect to the casing 2 along the axis of rotation LL, the shaft 1 being guided by the contact of the roller bearings 6 of the bearing 3 with the inner ring 5 and the outer rings 4.

In addition, with reference to FIG. 2a or FIG. 2b, the PTFE seal 20 and the support ring 21 thereof preferably have a diameter which is slightly greater than those of the portions 18, 15 which are rigidly connected to the shaft 1 of the radial sealing means 10, for the downstream passage. It is thus possible to install the shaft 1 in the casing 2 without the PTFE seal 20 rubbing against said elements 18, 15.

Secondly, in the region of the upstream radial sealing means 9, the cylindrical surface 12 in this case is increased in the upstream direction by a value which is at least equal to the distance d4 of offset between the operating position and the intermediate position.

In this way, as can be seen in FIG. 3, when the shaft is in the intermediate position, the segmented radial seal 11 cooperates with the cylindrical surface 12 and the PTFE seal 20 cooperates with the ring 22 in such a way that pressurised sealing is ensured at the two passages of the shaft 1 into the lubricating enclosure 8 at the same time.

This intermediate position advantageously defines a test position for the segmented radial seal 11. Indeed, since the segmented radial seal 11 is located in the upstream passage of the shaft 1, said seal becomes inaccessible when installed in the casing 2. It is then impossible to carry out direct inspections in order to check the condition thereof.

Figure 4:
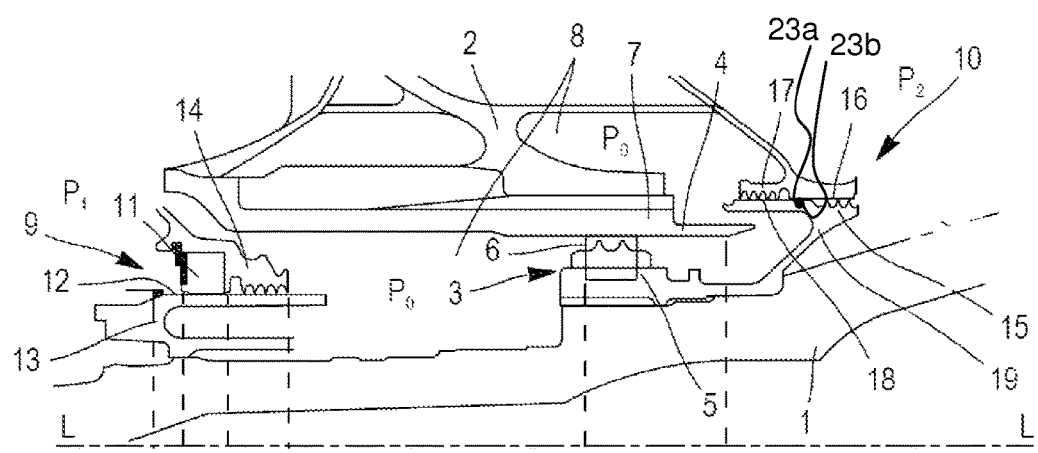
FIG. 4 is a schematic view of a meridian section of a stator and of a rotor according to a variant of the invention when the rotor is in the operating position in a turbine engine.

In one variant, which is shown in FIG. 4, the test position is the same as the operating position. In this variant, an annular seal 23b is inserted into a groove 23b which is made in a portion of the cylindrical surface 18 of the rotor which cooperates with the twist 17 on the stator. Said annular seal 23b bears, in this position, against the cylindrical surface 16 of the stator which cooperates with the labyrinth 15 of the stator, so as to ensure pressurised sealing when the rotor is not rotating.

The annular seal 23b in this case is made of a material, for example of beeswax, which melts when exposed to the heat generated by the friction when the rotor is set into rotation, during the operating conditions thereof. In this way, said seal is removed when the turbine engine is in operation and does not cause losses due to friction.

When configured as shown in FIG. 3, the mounting procedure can advantageously be supplemented by a test procedure.

For this purpose, after having docked the roller bearings 6 and the corresponding ring 4 of the bearing 3, a first step consists in continuing to translate the shaft 1 in the upstream direction as far as the intermediate position.

In this position, the PTFE seal 20 ensures pressurised sealing at the downstream passage of the shaft 1 into the lubricating enclosure 8. In addition, if the segmented radial seal 11 is operating correctly, it ensures pressurised sealing at the upstream passage by cooperating with the extension of the cylindrical surface 12 provided for said purpose, which is rigidly connected to the shaft 1.

It is thus possible to carry out a test step in this position, by using, for example, the openings for the passage of the oil into the lubricating enclosure 8 to suck in the air and create a negative pressure in the enclosure 8. Observing the change in pressure in the lubricating enclosure 8 then provides information about the condition of the segmented radial seal 11. If the seal has been damaged, for example when contacting the cylindrical surface 12, it will leak to too great an extent, which will lead to a rapid increase in pressure.

If, by contrast, the depressurisation test shows that the segmented radial seal 11 is in good condition, the following step consists in continuing to translate the shaft 1 in the upstream direction in order to lead the shaft into the operating position thereof in the casing 2.

Advantageously, the portions of the cylindrical surface 12, which is rigidly connected to the shaft 1, which cooperate with the segmented radial seal 11 in the operating position and in the intermediate, test position, form a single, continuous face. In this way, when the shaft 1 is translated from one position to the other, the segmented radial seal 11 remains in contact with said face. There is thus no risk of damaging the seal 11 through impacts upon contacting different faces.

In one variant, the test of the segmented radial seal 11 can be carried out after a period of operation of the turbine engine. In this case, the first step consists in offsetting the shaft 1 in the downstream direction by the distance d4 in order to move said shaft from the operating position to the intermediate, test position, and then carrying out the depressurisation test. If the test is conclusive, the shaft 1 can then be returned to the operating position thereof, without having to be completely demounted from the casing 2.

In the variant corresponding to FIG. 4, the first step of the test procedure during mounting consists, after having carried out the docking of the roller bearings 6 and of the corresponding ring 4 of the bearing 3, in continuing to translate the shaft 1 in the upstream direction as far as the operating position, which is also the test position. During this step, the material of the annular seal 23a can deform in order to slide against the cylindrical surface 17, whilst being held in position on the rotor 1 by the groove 23b.

Then, the rotor being kept stationary, it is possible to carry out the same steps as in the previous variant in order to carry out the test of the radial sealing joint, the annular seal 23a ensuring sealing at the other end by means of pressure against the cylindrical surface 17. By contrast, there is no translation step after the test, as the rotor is already in the operating position thereof.

Then, in a subsequent step, when the turbine engine is assembled, the annular seal 23a, in this case made of beeswax, melts when the turbine engine is first put into operation and disappears. The disappearance thereof means that there is no more contact between the rotor and the stator at this location, and therefore no losses are made there as a result of friction.

The advantage of this variant is that it is not necessary to provide a radial extension which is complementary to the cylindrical surface 12 in order for the radial sealing joint 11 to be active during the test procedure during mounting. The assembly can thus be more compact.

The invention claimed is:

1. A turbine engine element comprising a stator, a rotor, and a first sealing means between the rotor and the stator which is arranged so as to be active when the rotor is in an operating position around an axis of rotation of said rotor, wherein the turbine engine element comprises an auxiliary pressurized sealing means, between the rotor and the stator, wherein the element is arranged so that said first sealing means and said auxiliary pressurized sealing means are active when the rotor is placed along the axis of rotation of said rotor during a process of mounting in a test position, the rotor and the stator forming, in said test position, an enclosure between said first sealing means and said auxiliary pressurized sealing means, and wherein the auxiliary pressurized sealing means is arranged so as to be or become inactive when the rotor is placed in an operating position.

2. The turbine engine element according to claim 1, wherein the auxiliary pressurized sealing means is arranged so as to be inactive before any operation of the turbine engine element.

3. The turbine engine element according to claim 2, wherein the auxiliary pressurized sealing means comprises a pressurized sealing joint which is rigidly connected to one of the bodies among the rotor or the stator and is arranged so as to rest on a first cylindrical sealing surface when the rotor is in a test position which is axially offset by a distance which is determined with respect to the operating position and so as to be removed from said first cylindrical sealing surface when the rotor is in the operating position.

4. The turbine engine element according to claim 3, further comprising a bearing between the stator and the rotor, said bearing comprising roller bearings between a first ring and a second ring, one of said first ring and said second ring being rigidly connected to the stator, and the other being rigidly connected to the rotor, wherein the first ring allows the rolling bearings to slide axially, and wherein the axial extension of said first ring is arranged so as to act as a surface for guiding the rotor along the axis of rotation during a movement from the operating position to the test position or inversely.

5. The turbine engine element according to claim 3, wherein the rotor is arranged so as to be mounted in the stator in a mounting direction along the axis of rotation, and the test position is located before the operating position along said mounting direction.

6. The turbine engine element according to claim 1, wherein the auxiliary pressurized sealing means is arranged so as to be inactive during a first operation when the rotor rotates at a speed which is at least equal to a predetermined value.

7. The turbine engine element according to claim 6, wherein the auxiliary pressurized sealing means comprises a pressurized sealing joint which is rigidly connected to one of the bodies among the rotor or the stator and is arranged so as to rest on a second cylindrical sealing surface when the rotor is fixed in rotation with respect to the stator and so as to be removed when the rotor is set into rotation.

8. The turbine engine element according to claim 1, wherein the stator and the rotor are arranged so as to form an enclosure for lubricating a device which is located axially between said first sealing means and said auxiliary pressurized sealing mean when the rotor is in the operating position thereof.

9. The turbine engine element according to claim 1, wherein the first sealing means comprises a radial pressurized sealing joint, for example a segmented radial joint, which is rigidly connected to one of the bodies among the rotor or the stator and is arranged so as to rest on a third cylindrical sealing surface, which is rigidly connected to the other body, when said first means is active.

10. A turbine engine comprising an element according to claim 1.

* * * * *